(12) United States Patent
Takahashi et al.

(10) Patent No.: US 7,712,767 B2
(45) Date of Patent: May 11, 2010

(54) AIRBAG DEVICE

(75) Inventors: Hiroyuki Takahashi, Aichi-ken (JP); Yoshimitsu Satou, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 194 days.

(21) Appl. No.: 12/083,634

(22) PCT Filed: Oct. 13, 2006

(86) PCT No.: PCT/IB2006/002872

§ 371 (c)(1),
(2), (4) Date: Apr. 16, 2008

(87) PCT Pub. No.: WO2007/045957

PCT Pub. Date: Apr. 26, 2007

(65) Prior Publication Data

US 2009/0267327 A1 Oct. 29, 2009

(30) Foreign Application Priority Data

Oct. 18, 2005 (JP) .............................. 2005-302638

(51) Int. Cl.
*B60R 21/16* (2006.01)
(52) U.S. Cl. .................. 280/728.3; 180/274; 280/730.1
(58) Field of Classification Search ............... 280/728.3, 280/730.1; 180/274, 271
See application file for complete search history.

(56) References Cited

U.S. PATENT DOCUMENTS

| 6,827,170 | B2 | 12/2004 | Hamada et al. |
| 2003/0042714 | A1 | 3/2003 | Sawa |
| 2005/0205333 | A1 | 9/2005 | Mori et al. |

FOREIGN PATENT DOCUMENTS

| JP | 7-81510 | 3/1995 |
| JP | 7-246908 | 9/1995 |
| JP | 8-11662 | 1/1996 |
| JP | 2003-291756 | 10/2003 |
| JP | 2004-123085 | 4/2004 |
| JP | 2005-280553 | 10/2005 |

OTHER PUBLICATIONS

International Search Report.
Written Opinion of the ISR.

*Primary Examiner*—Eric Culbreth
(74) *Attorney, Agent, or Firm*—Finnegan, Henderson, Farabow, Garrett & Dunner, LLP (57) ABSTRACT

An airbag device includes a door (16), an inflator (18), and an airbag (20). The door (16), provided in a vehicle-body outer panel (12), is opened to open an opening (12A) in the vehicle-body outer panel (12) when a predetermined situation occurs. The inflator (18) is disposed inside the door (16). The inflator (18) includes a gas-injection port (36) that is closer to the end (16B) of the door (16) in the longitudinal direction of the door (16) than to the center of the door (16) in the longitudinal direction of the door (16). The airbag (20) is disposed at a predetermined position inside the vehicle-body outer panel (12). When the predetermined situation occurs, the airbag (20) is inflated by the pressure of the gas supplied from the inflator (18) to open the door (16), and the airbag (20) passes through the opening (12A) in the vehicle-body outer panel (12), and is deployed toward the outside of a vehicle body. The high inflation pressure of the airbag (20) is applied to the end (16B) of the door (16).

11 Claims, 7 Drawing Sheets

AIRBAG DEVICE

BACKGROUND OF THE INVENTION

1. Field of the Invention

The invention relates to an airbag device that includes an airbag that is deployed toward the outside of a vehicle body, such as a hood airbag device.

2. Description of the Related Art

Japanese Patent Application Publication No. JP-A-8-11662 describes a hood airbag device including an airbag that is deployed toward the outside of a vehicle body. When the airbag device operates, a lid (door) having a rectangular shape, which covers an opening formed in a hood, is opened by the deployment force of the airbag. Then, the airbag passes through the opening, and is deployed toward the outside of the vehicle body.

The hood airbag device described in Japanese Patent Application Publication No. JP-A-8-11662 is proposed on the assumption that the door has a rectangular shape. Therefore, for example, in the case where the door is elongate in a vehicle-width direction, or in the case where the door is curved, the output of an inflator needs to be increased to sufficiently open the entire door from the center to the ends. This results in an increase in the cost.

SUMMARY OF THE INVENTION

It is an object of the invention to make it possible to sufficiently open an entire door that is elongate in a longitudinal direction, from the center to the ends, when an airbag is deployed.

A first aspect of the invention relates to an airbag device that includes a door, an inflator, and an airbag. The door, provided in a vehicle-body outer panel, is opened to open an opening in the vehicle-body outer panel when a predetermined situation occurs. The inflator is disposed inside the door. The inflator includes a gas-injection port that is disposed such that the pressure of gas applied to the end of the door in the longitudinal direction of the door is higher than the pressure of the gas applied to the center of the door in the longitudinal direction of the door. The airbag is disposed at a predetermined position inside the vehicle-body outer panel. When the predetermined situation occurs, the airbag is inflated by the pressure of the gas supplied from the inflator to open the door, and the airbag passes through the opening in the vehicle-body outer panel, and is deployed toward the outside of a vehicle body.

In the airbag device according to the first aspect, the gas-injection port of the inflator is disposed such that the pressure of gas applied to the end of the door in the longitudinal direction of the door is higher than the pressure of the gas applied to the center of the door in the longitudinal direction. Therefore, when the airbag device operates, the high inflation pressure of the airbag is applied not only to the center of the door, but also to the ends of the door, due to the injection of the gas. Thus, even when the door is elongate in the longitudinal direction, the entire door from the center to the ends can be sufficiently opened.

In the first aspect, the inflator may be disposed such that the gas-injection port is closer to the end of the door than to the center of the door in the longitudinal direction of the door.

With this configuration, when the airbag device operates, the high inflation pressure of the airbag is applied also to the ends of the door, due to the injection of the gas. Thus, even the ends of the door can be sufficiently opened.

Also, when the airbag is deployed, it is possible to sufficiently open the entire door that is elongate in the longitudinal direction, from the center to the ends.

In the above-described aspect, a pair of inflators may be disposed such that the gas-injection port of each of the inflators is closer to the corresponding end of the door than to the center of the door in the longitudinal direction of the door.

With this configuration, when the airbag device operates, the high inflation pressure of the airbag is applied also to the ends of the door, due to the injection of the gas. Thus, even the ends of the door can be sufficiently opened.

In the above-described aspect, the gas-injection port may be disposed in the area that overlaps at least an attachment hinge provided in the door, in the longitudinal direction of the door.

With this configuration, when the airbag device operates, the greatest force of the injected gas is applied to the attachment hinge provided in the door, via the airbag. Therefore, the force required to open the door can be effectively transmitted to the door, and the door can be sufficiently opened.

In the above-described aspect, the attachment hinge, which overlaps the area in which the gas-injection port is disposed, may be an attachment hinge closest to the end of the door, among a plurality of attachment hinges provided in the door in the longitudinal direction of the door.

According to the above-described aspect, the gas-injection port of the inflator is disposed in the area that overlaps the attachment hinge closest to each end of the door, among the plurality of attachment hinges provided in the door in the longitudinal direction of the door. Therefore, when the airbag device operates, the greatest force of the injected gas is applied to the attachment hinge closest to each end, and the area around the attachment hinge, via the airbag. As a result, the high inflation pressure of the airbag is applied even to the ends of the door. Thus, the entire door from the center to the ends can be sufficiently opened.

According to the above-described aspect, the gas-injection port is close to the attachment hinge closest to each end of the door in the longitudinal direction, among the plurality of attachment hinges provided in the door in the longitudinal direction of the door. Alternatively, the gas-injection port is closer to the end of the door than the attachment hinge closest to the end of the door is. Therefore, when the airbag device operates, the high inflation pressure of the airbag is applied even to the ends of the door. Thus, the entire door from the center to the ends can be sufficiently opened.

In the above-described aspect, at least the attachment hinge closest to the end of the door may include a deformable portion that can be plastically deformed when the door is opened. Also, the deformable portion may include a droop portion that is elongate, and extends downward from a connection portion connected to the door, and an intermediate portion that extends toward the rear of a vehicle from the droop portion.

In the airbag device according to the above-described aspect, at least the attachment hinge closest to each end of the door includes the deformable portion that can be plastically deformed when the door is opened. When the great force of the gas injected from the inflator is applied to the attachment hinge that includes the deformable portion, the deformable portion is gradually plastically deformed, and accordingly the door is opened. In other words, the gas-injection port of the inflator is disposed in the area that overlaps the attachment hinge closest to each end of the door, because the entire door from the center to the ends cannot be sufficiently opened unless at least the attachment hinge closest to each end of the door is sufficiently plastically deformed.

According to the above-described aspect, when the airbag device operates, the deformable portion can be sufficiently plastically deformed by the inflation pressure of the airbag. Thus, the entire door from the center to the ends can be sufficiently opened. Also, because the door cannot be opened unless at least the attachment hinge closest to each end of the door is plastically deformed, the door is stably attached to the vehicle-body outer panel when the airbag device does not operate.

In the above-described aspect, the gas-injection port may be provided at a position corresponding to the position of each of all the attachment hinges.

In the airbag device according to the above-described aspect, the gas-injection port is provided at a position corresponding to each of all the attachment hinges. Therefore, when the airbag device operates, the force of the gas injected from the inflators is efficiently applied to all the attachment hinges, and a sufficient moment is applied to the door so that the door pivots around the attachment hinges, and is opened. Particularly in the case where the attachment hinge includes the deformable portion that can be plastically deformed, a moment required to sufficiently plastically deform the deformable portion can be applied to the door.

Thus, according to the above-described aspect, the entire door can be sufficiently opened.

In the above-described aspect, the position of the gas-injection port may be set such that a reference position of the gas-injection port is at the distance of 50 mm to 150 mm from the end of the door toward the center of the door in the longitudinal direction of the door. The reference position is the centroid of a single hole of the gas-injection port, or the centroid of a predetermined hole among a plurality of holes of the gas-injection port, the force of the gas injected through the predetermined hole being greatest among forces of the gas injected through all the plurality of holes of the gas-injection port.

The position of the gas-injection port of the inflator is set such that the reference position of the gas-injection port is at the distance of 50 mm to 150 mm from the end of the door in the longitudinal direction of the door, because the door can be sufficiently opened when the reference position of the gas-injection port is in this range.

With this configuration, when the airbag device operates, the entire door from the center to the ends can be sufficiently opened by the inflation pressure of the airbag.

According to the above-described aspect, when the airbag device operates, the entire door from the center to the ends can be sufficiently opened by the inflation pressure of the airbag.

In the above-described aspect, the gas-injection port may be composed of the plurality of holes that are arranged in a staggered manner in the end portion of the inflator in the longitudinal direction of the door.

The airbag device according to the above-described aspect may further include a diffuser pipe that is fitted to the inflator.

In the above-described aspect, the diffuser pipe may have an L-shape, and the gas-injection port may be the end portion of the diffuser pipe, which is open to the door. Also, the diffuser pipe may be elongate in the longitudinal direction of the door, and the gas-injection port may be composed of a plurality of holes that are arranged in the outer peripheral surface of the diffuser pipe.

In the above-described aspect, the door may be curved in the plan view of the door.

According to the above-described aspect, even in the case where the door is curved in the plan view of the door, when the airbag device operates, the entire door from the center to the ends can be sufficiently opened by the inflation pressure of the airbag.

BRIEF DESCRIPTION OF THE DRAWINGS

The foregoing and/or further objects, features and advantages of the invention will become more apparent from the following description of example embodiments with reference to the accompanying drawings, in which the same or corresponding portions are denoted by the same reference numerals and wherein:

FIG. 3A to FIG. 3C are sectional views taken along line 3-3 in FIG. 1, which show the positional relation between the end of a door and the gas-injection port of an inflator, FIG. 3A shows the case where the gas-injection port is composed of a plurality of small holes, which are arranged in a staggered manner in a small area in the longitudinal direction of the door, FIG. 3B shows the case where a diffuser pipe having an L-shape is fitted to the inflator, and the gas-injection port is the end portion of the diffuser pipe, which is open to the door, and FIG. 3C shows the case where a diffuser pipe, which is elongate in the longitudinal direction of the door, is fitted to the inflator, and the gas-injection port is composed of a plurality of holes that are arranged in a straight line in the diffuser pipe;

DETAILED DESCRIPTION OF THE EXAMPLE EMBODIMENTS

Figure 1:
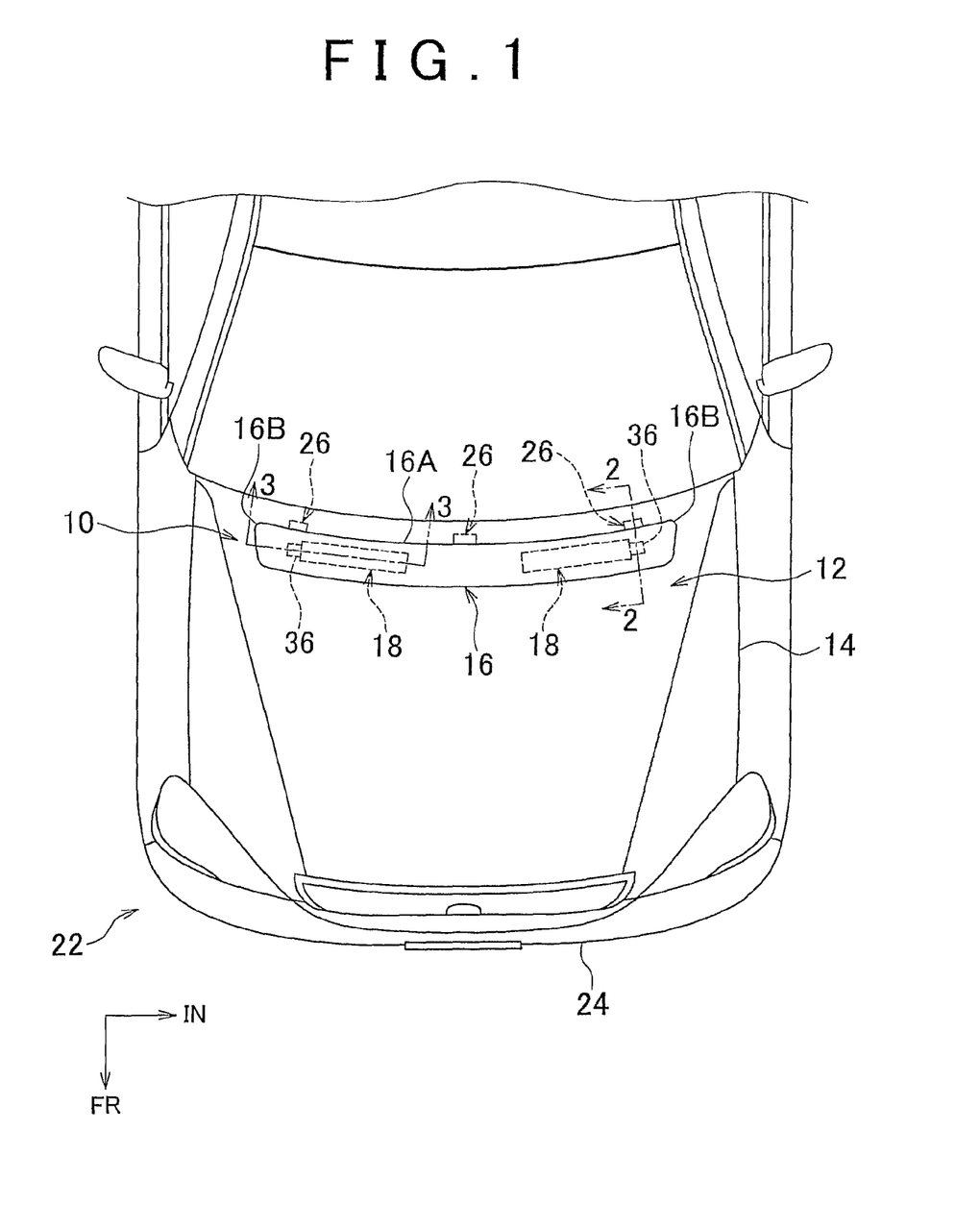
FIG. 1 is a plan view showing the substantially front half portion of a vehicle in which an airbag device according to an embodiment of the invention is employed inside a hood.

Hereinafter, an embodiment of the invention will be described with reference to the accompanying drawings. In FIG. 1, an airbag device 10 according to the invention is a hood airbag device that is provided, for example, inside a hood outer panel 12, that is, inside a hood 14. The hood outer panel 12 is an example of a vehicle-body outer panel. The airbag device 10 includes a door 16, an inflator 18, and an airbag 20.

Figure 2:
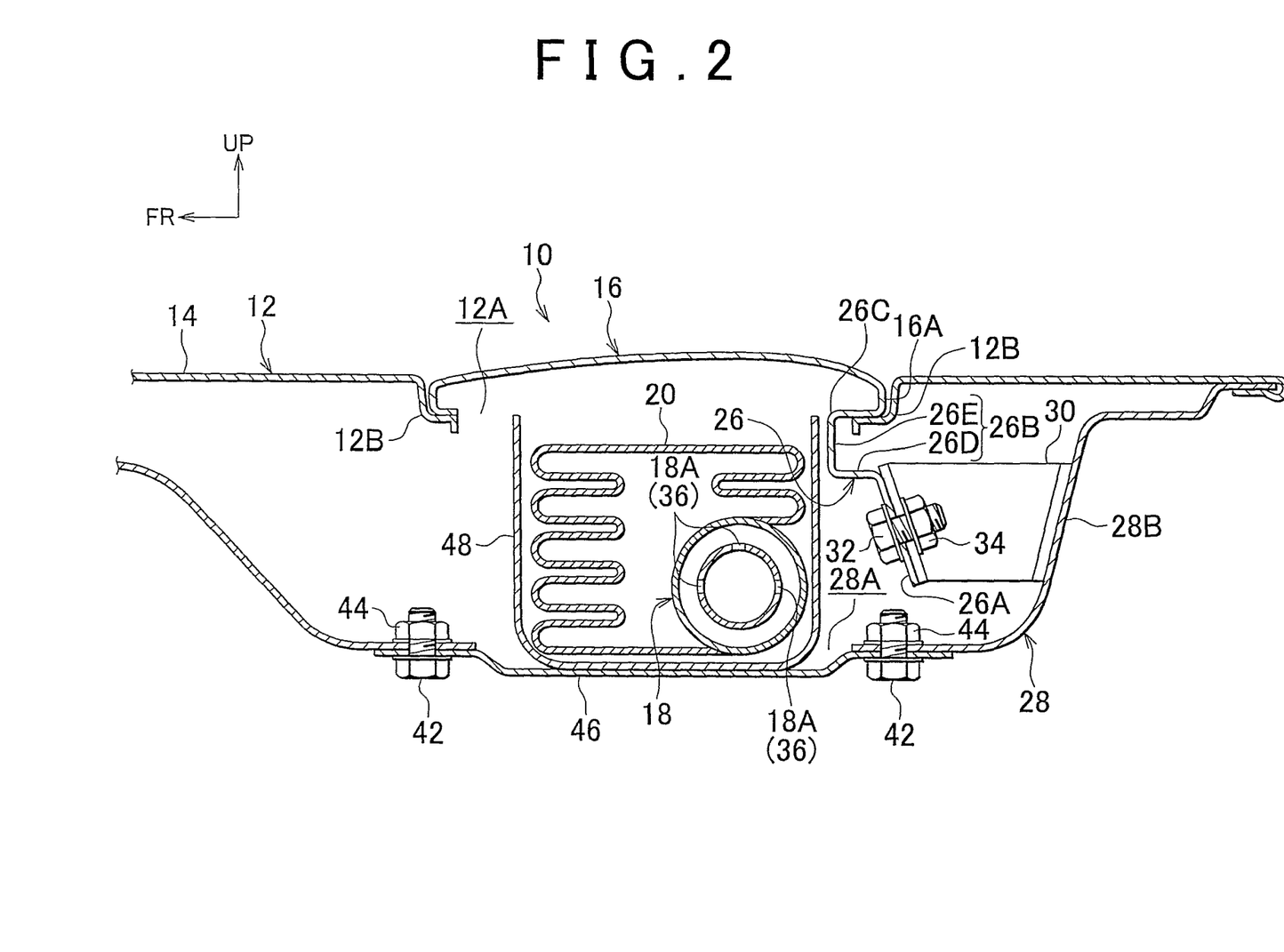
FIG. 2 is a sectional view taken along line 2-2 in FIG. 1.
Figure 4:
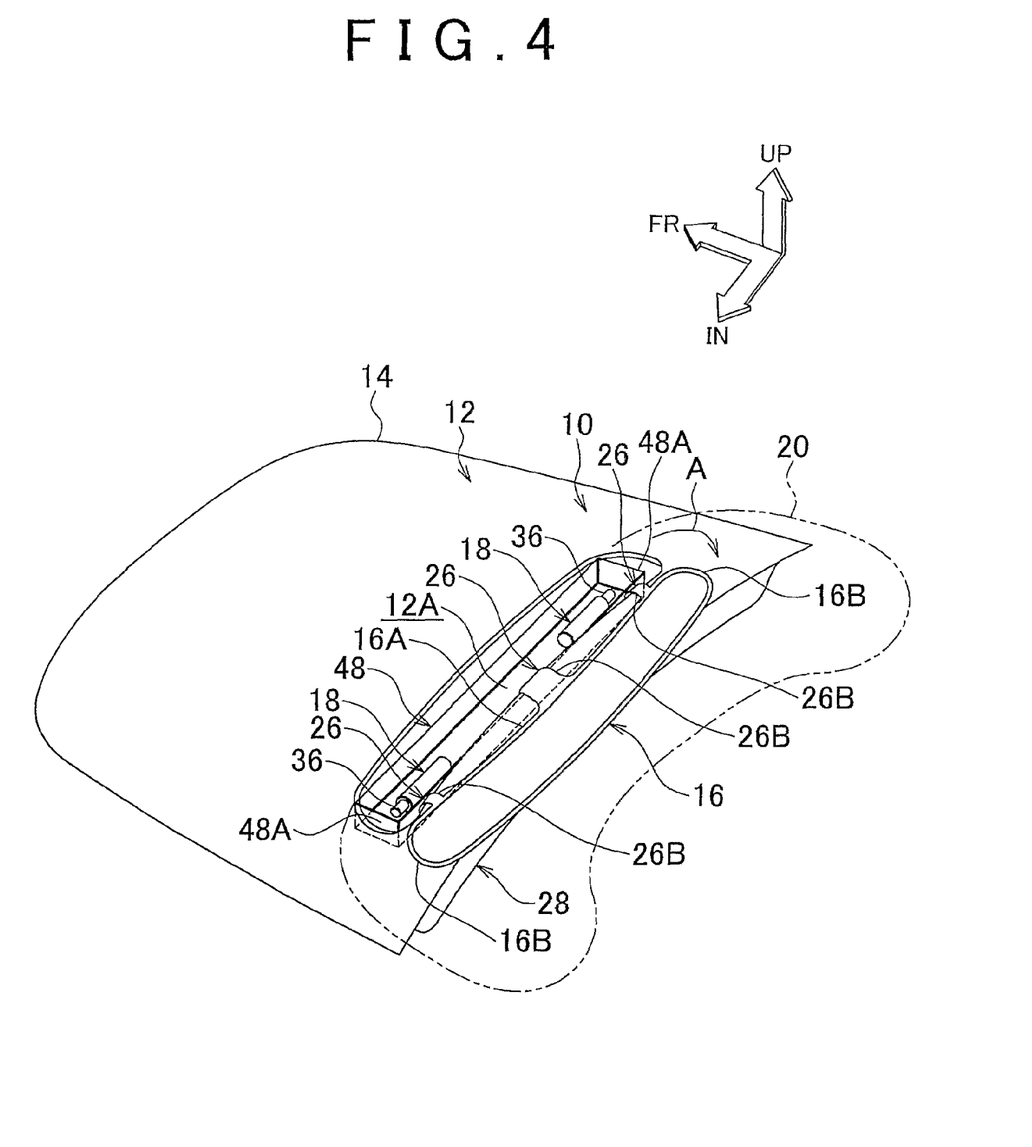
FIG. 4 is a perspective view showing that the door is uniformly opened while the door is maintained in a flat shape, an airbag passes through an opening, and is deployed in the area which is outside a hood, and which is closer to the rear of a vehicle.

The door 16, which is a covering body, is provided in the hood outer panel 12. When a predetermined situation occurs, that is, when an impactor (not shown) hits the front bumper 24 of a vehicle 22 in which the airbag device 10 according to the embodiment is employed, the door 16 is opened by an airbag 20 that is inflated and deployed. Then, the door 16 opens an opening 12A in the hood outer panel 12, as shown in FIG. 4. As shown in FIG. 2 and FIG. 4, one door 16 is fitted to the hood outer panel 12 such that the door 16 is positioned inside the frame portion 12B that is a concave portion formed in the hood outer panel 12.

As shown in FIG. 1, the door 16 is elongate in a vehicle-width direction in the plan view of the door 16. The door 16 has a substantially equal width over the entire length thereof.

The door 16 has a curved shape. That is, the center of the door 16 in the longitudinal direction protrudes toward one side in the width direction of the door 16 (i.e., toward the front of the vehicle in the embodiment). The invention is not limited to the door 16 that is formed separately from the hood outer panel 12. That is, the door 16 may be formed integrally with the hood outer panel 12. In this case, when the airbag 22 is inflated, the hood outer panel 12 is torn at a position corresponding to the frame portion 12B, and the door 16 is opened. Also, the invention is not limited to the door 16 that is elongate in the vehicle-width direction as shown in FIG. 1. That is, the door 16 may be shorter than the door 16 shown in FIG. 1, in the case where an airbag having a small capacity (not shown) is provided.

Further, attachment hinges 26 are provided in the rear edge portion 16A of the door 16 at three positions, for example, a center position and positions near both ends 16B. The attachment hinges 26 connect the door 16 to the hood 14 such that the door 16 is opened in a predetermined direction, for example, toward the rear of the vehicle when the airbag 20 is inflated. More specifically, as shown in FIG. 2, one end 26A of each attachment hinge 26 is fixed to an attachment bracket 30 fixed to a vertical wall 28B in the rear portion of a hood inner panel 28, using a bolt 32 and a nut 34. The other end of each attachment hinge 26 is a connection portion 26C connected to the door 16.

The attachment hinge 26 has a deformable portion 26B that can be plastically deformed when the door 16 is opened. For example, the deformable portion 26B of the attachment hinge 26 is formed to be bent so that the required amount of deformation stroke can be obtained. More specifically, the deformable portion 26B includes a droop portion 26E and an intermediate portion 26D. The droop portion 26E is elongate, and extends downward from the connection portion 26C connected to the door 16. The intermediate portion 26D extends from the droop portion 26E toward the rear of the vehicle. The one end 26A of the attachment hinge 26 obliquely extends from the rear end of the intermediate portion 26D toward the bottom of the vehicle. In the case where the center of the door 16 protrudes toward the front of the vehicle, and the attachment hinge 26 at the center position includes the deformable portion 26B as shown in FIG. 1, it is preferable that the area that is deformed in the deformable portion 26B of the attachment hinge 26 disposed at the center position be larger than the areas that are deformed in the deformable portions 26B of the attachment hinges 26 disposed at the positions near the both ends.

As shown in FIG. 1, a pair of inflators 18 is provided in an airbag 20 (refer to FIG. 4) such that the gas-injection port 36 of each inflator 18 is disposed in the area that overlaps at least the attachment hinge 26 that is closer to the end 16B than to the center of the door 16 in the longitudinal direction, for example, the attachment hinge 26 closest to the end 16B of the door 16. When the predetermined situation occurs, the inflator 18 injects a large amount of gas through the gas-injection port 36, and supplies the gas into the airbag 20. The phrase "the gas-injection port 36 of each inflator 18 is disposed in the area that overlaps at least the attachment hinge 26 closest to the end 16B" signifies that the position of the gas-injection port 36 of each inflator 18 in the longitudinal direction of the door 16, that is, in the vehicle-width direction overlaps at least a portion of the attachment hinge 26 closest to the end 16B, in the direction orthogonal to the longitudinal direction of the door 16, for example, in the vehicle fore-and-aft direction in the plan view of the vehicle. The gas-injection port 36 may overlap the attachment hinge 26 and extend to the end 16B of the door 16.

Figure 3A:
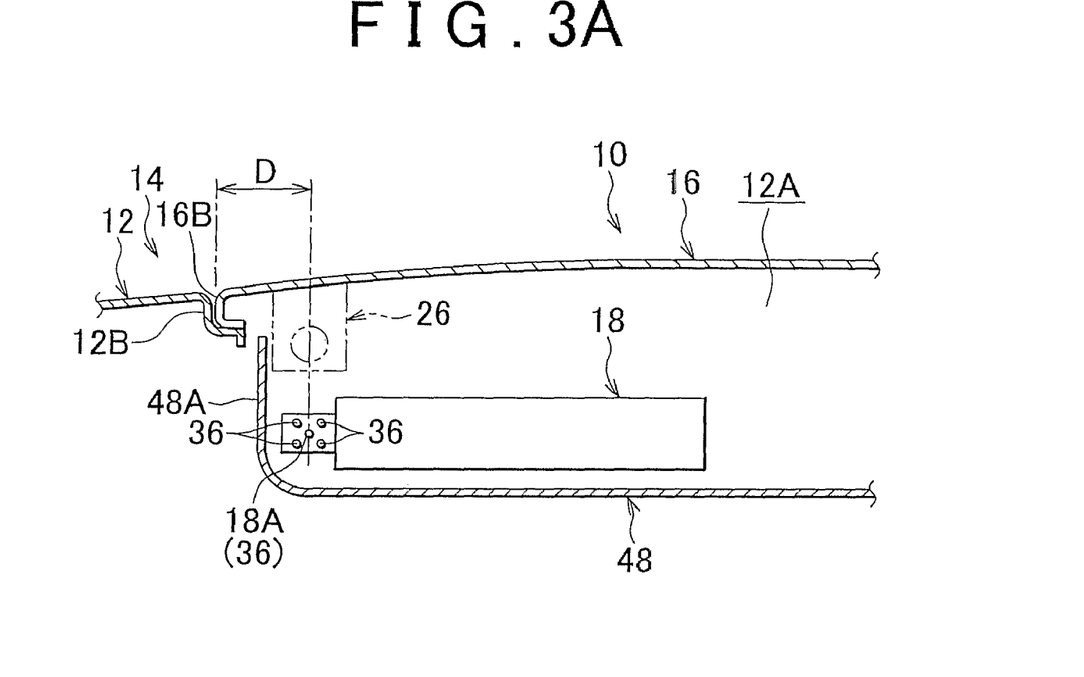
Figure 3B:
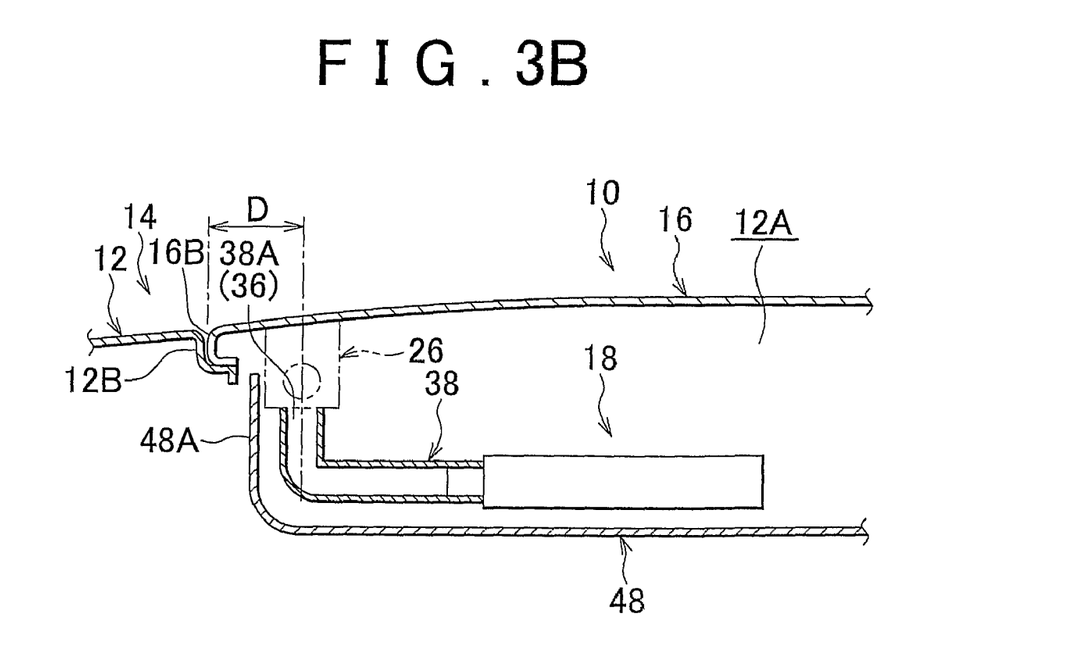
Figure 3C:
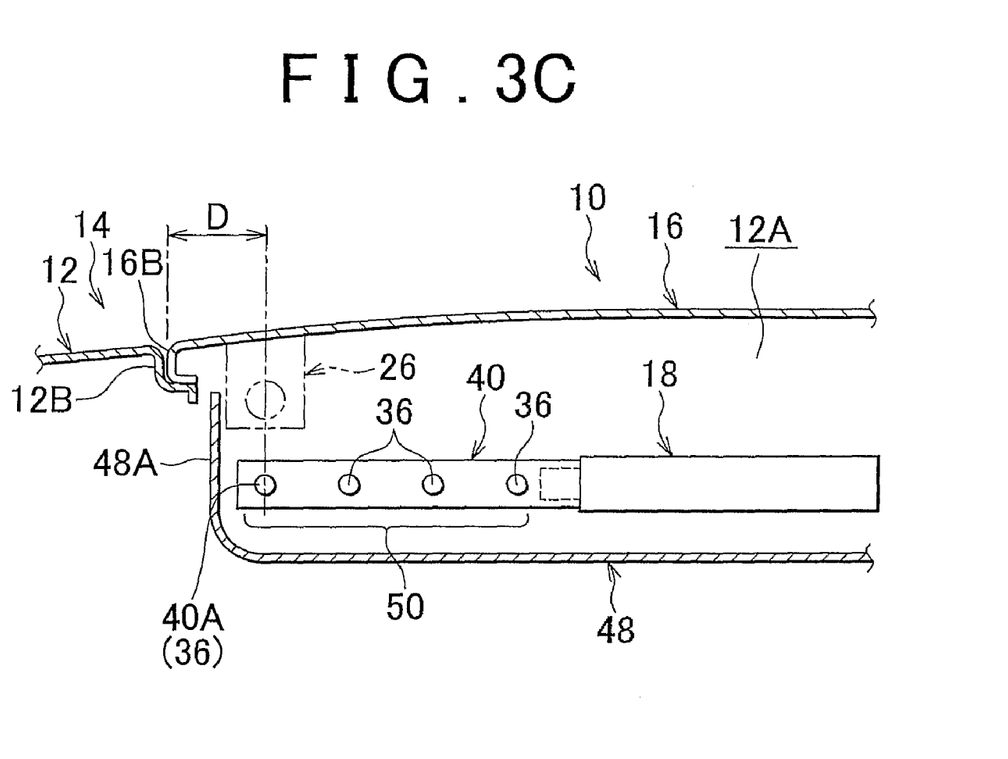

In FIGS. 3A, 3B, and 3C, the centroids of holes 18A, 38A, and 40A are regarded as reference positions, respectively. The position of the gas-injection port 36 is set such that a distance D between the end 16B and the centroid of each of the holes 18A, 38A, and 40A in the longitudinal direction of the door 16 is in a range of 50 mm to 150 mm. The force of the gas injected through the hole 18A is greatest among the forces of the gas injected through all the holes of the gas-injection port 36 in FIG. 3A. The force of the gas injected through the hole 40A is greatest among the forces of the gas injected through all the holes of the gas-injection port 36 in FIG. 3C. The lower limit of the distance D is set to 50 mm, because it would be difficult to install the inflator 18 in a small space if the distance D were shorter than 50 mm. The upper limit of the distance D is set to 150 mm, because the airbag 20 would be deployed late, and the both ends 16B of the door 16 would not be sufficiently opened if the distance D were longer than 150 mm. That is, by setting the range of the distance D, the entire door 16 from the center to both ends 16B can be sufficiently opened. The position of the attachment hinge 26 closest to the end 16B of the door 16 is set based on the position of the gas-injection port 36. That is, the position of the attachment hinge 26 closest to the end 16B is set such that the attachment hinge 26 overlaps at least a portion of the gas-injection port 36 in the longitudinal direction of the door 16. Preferably, the attachment hinge 26 closest to the end 16B is positioned at the distance D from the end 16B.

The gas-injection port 36 may have various configurations, as shown in FIG. 3A to FIG. 3C. In each of the configurations, the reference position of the gas-injection port 36 is set. FIG. 3A shows the case where the gas-injection port 36 is composed of a plurality of holes arranged, for example, in a staggered manner in a small area in the longitudinal direction of the door 16, that is, in the end portion of the inflator 18. In this case, the centroid of the small hole 18A near the center in the arranging direction is regarded as the reference position, for the sake of convenience. In the case where the small holes are arranged in a small area as shown in FIG. 3A, the force of the gas injected through the small hole 18A does not necessarily need to be greatest.

FIG. 3B shows the case where the diffuser pipe 38 having an L-shape is fitted to the inflator 18, and the gas-injection port 36 is the end portion 38A of the diffuser pipe 38, which is open to the door 16. In this case, the gas is injected through only the end portion 38A. Therefore, the centroid of the opening of the end portion 38A is regarded as the reference position.

Further, FIG. 3C shows the case where a diffuser pipe 40, which is elongate in the longitudinal direction of the door 16, is fitted to the inflator 18, and the gas-injection port 36 is composed of a plurality of holes that are arranged in series in the outer peripheral surface of the diffuser pipe 40. The hole 40A, which is positioned closest to the end 16B of the door 16, is regarded as the reference position. In the case where the diffuser pipe 38 or 40, or the like is combined with the inflator 18, the inflator 18 is regarded as including the diffuser pipe 38 or 40, or the like.

Thus, the centroid of the hole, which is most effective in sufficiently opening the end 16B of the door 16, is selected as the reference position of the gas-injection port 36. In FIG. 3A to FIG. 3C, the airbag 20 is omitted to clearly show the gas-injection port 36.

In the case where the gas-injection port 36 is composed of holes arranged in a large area in the longitudinal direction of the inflator 18 as shown in FIG. 3C, a region, which extends from the hole at one end to the hole at the other end of the arrangement, is referred to as "injection region 50". In this case, the inflator 18 is disposed such that the injection region 50 overlaps the attachment hinge 26 in the longitudinal direction of the door 16. The shape of each hole of the gas-injection port 36 is not limited to a circle. The hole may be a quadrangular hole, or a long hole. In the case where each hole of the gas-injection port 36 is a circular hole, the centroid of the hole is the center of the hole.

The manner in which the gas-injection port 36 overlaps the attachment hinge 26 is defined for the sake of convenience, as described above. However, for example, in the case where the gas is injected in the direction inclined with respect to the vehicle-height direction or vehicle fore-and-aft direction, the gas-injection port 36 is positioned such that sufficient pressure of gas is applied to the attachment hinge 26 via the airbag 20, irrespective of whether the gas-injection port 36 overlaps the attachment hinge 26. Accordingly, in this case, the position of the centroid, which is regarded as the reference position of the gas-injection port 36, does need to be strictly set.

In the case where each of all the attachment hinges 26 includes the deformable portion 26B, it is preferable that inflator 18 be provided at a position corresponding to the position of each of all the attachment hinges 26 (that is, it is preferable that three inflators 18 be provided in this embodiment). In the case where the door 16 is short in the vehicle-width direction, only one inflator 18 may be provided.

As shown in FIG. 2, the airbag 20 is disposed at a predetermined position inside the hood outer panel 12. For example, the airbag 20 is disposed in a case 48. When the predetermined situation occurs, the airbag 20 is inflated by the pressure of the gas supplied from the inflator 18, and the inflated airbag 20 opens the door 16. Then, the airbag 20 passes through the opening 12A in the hood outer panel 12, and is deployed toward the outside of the vehicle body. The airbag 20, which is appropriately folded, is housed in the case 48 that is open to the opening 12A. The airbag 20 and the inflator 18 are fixed to the case 48.

The case 48 is fixed on an attachment member 46 that is fitted to the lower surface of the hood inner panel 28 using a bolt 42 and a nut 44. The case 48 is inserted into an insertion hole 28A formed in the lower surface of the hood inner panel 28, and is disposed inside the hood 14. As shown in FIG. 3, the end 48A of the case 48 in the vehicle-width direction is positioned inside the opening 12A in the vehicle-width direction, taking into account the positional relation between the case 48 and the opening 12A of the hood outer panel 12.

Figure 6:
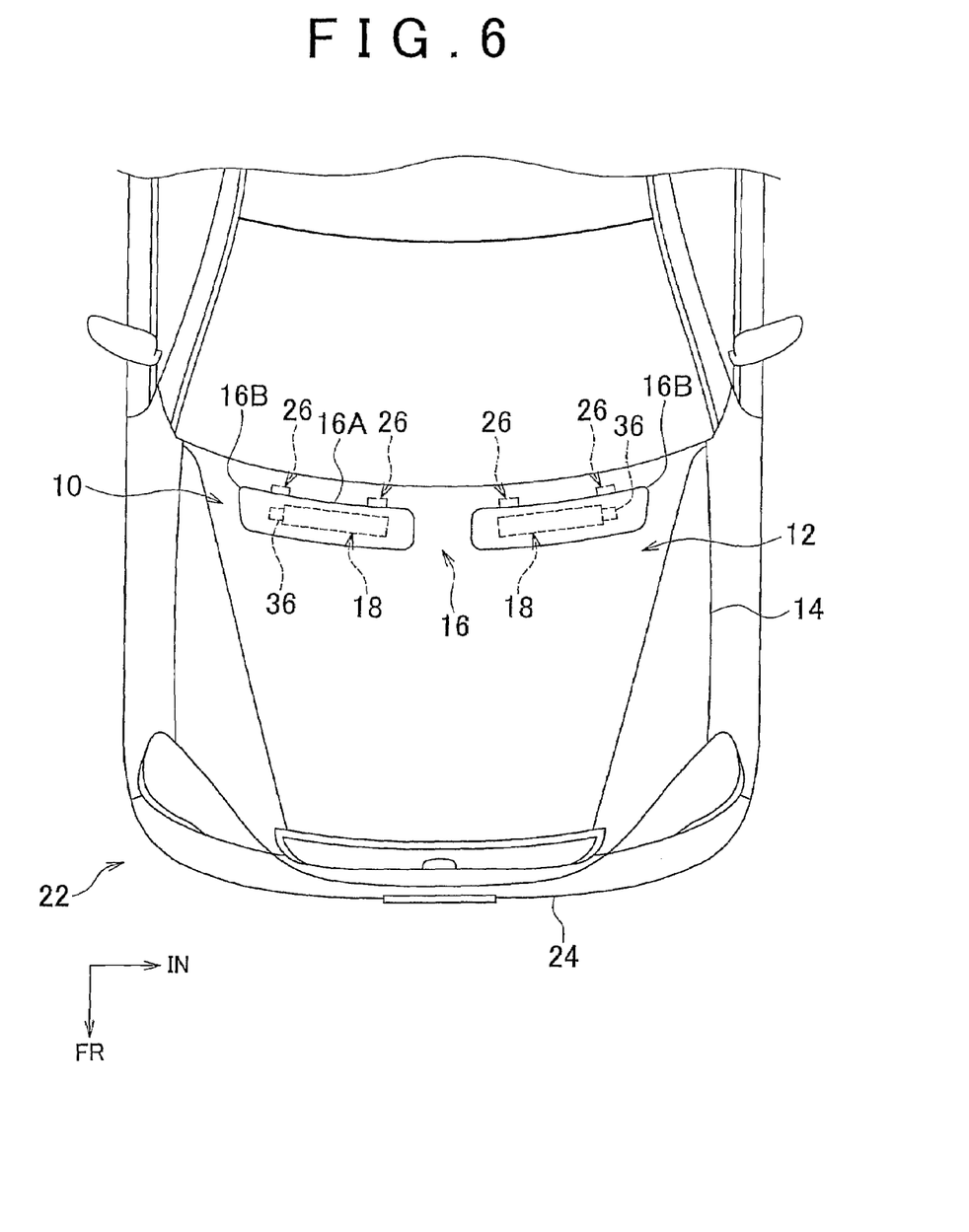
FIG. 6 is a plan view showing the substantially front half portion of a vehicle in which an airbag device including a pair of right and left doors is employed inside a hood.

The invention is not limited to one door 16 provided in the hood outer panel 12. As shown in FIG. 6, paired right and left doors 16, which are independent of each other, may be provided. In this case, one inflator 18 and one airbag (not shown) are provided to correspond to each of the doors 16. Three or more doors 16 may be provided.

Hereinafter, the effects obtained in this embodiment will be described. If an impactor collides with the front bumper 24 of the vehicle 22 to which the airbag device 10 is applied, an airbag ECU operates the inflator 18 in response to a signal from a frontal-collision sensor. Thus, a large amount of gas is supplied into the airbag 20 from the inflator 18. In FIG. 4, when the airbag 20 starts to be inflated by the pressure of the gas, the door 16 provided in the hood outer panel 12 is pressed from below by the airbag 20, and the door starts to be opened. Then, the deformable portions 26B of the attachment hinges 26 are plastically deformed so as to be unbent. Accordingly, the door 16 pivots around the attachment hinges 26 in a direction indicated by an arrow A, and is turned substantially upside down. As a result, the door 16 is placed in an open position.

Figure 5:
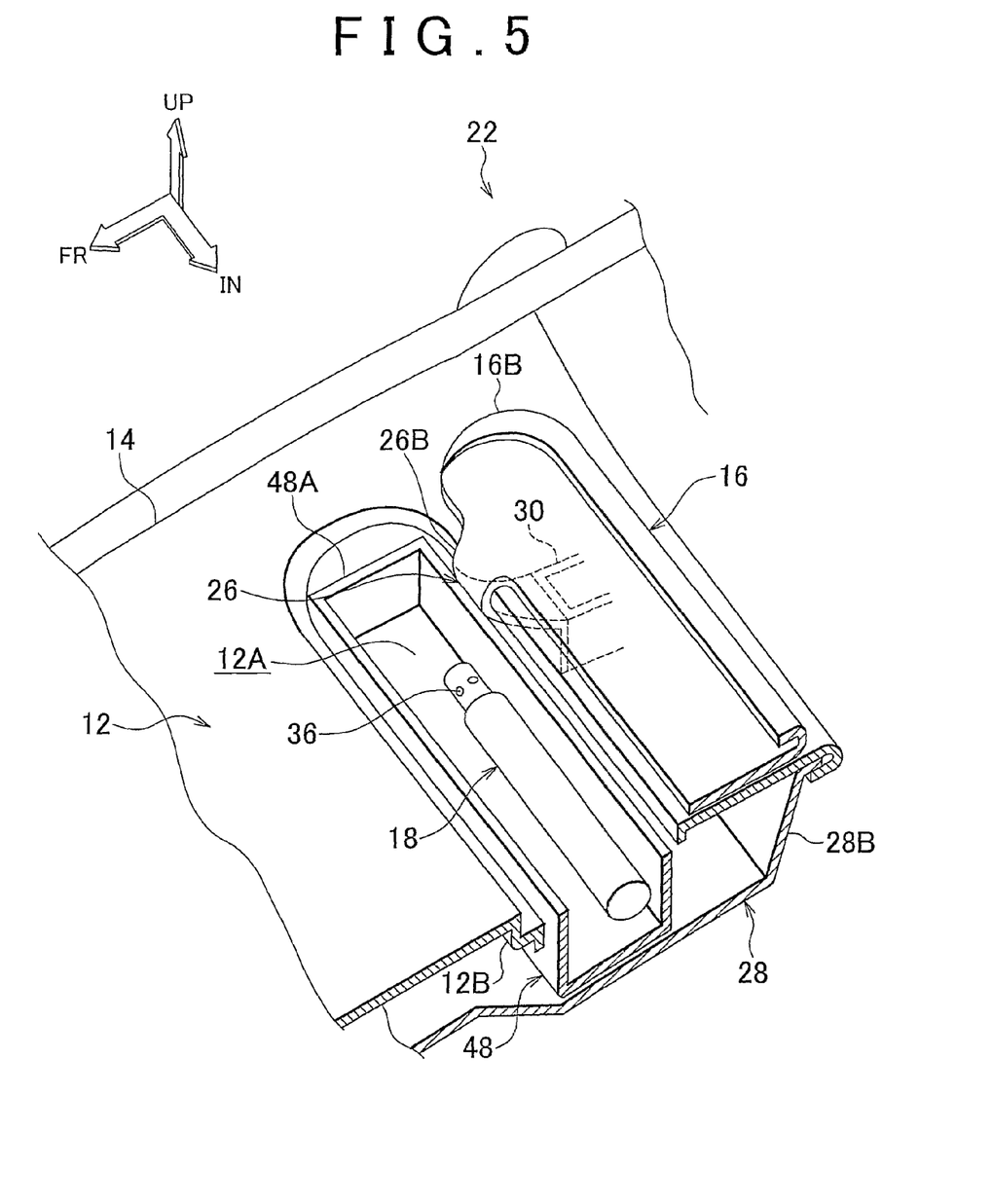
FIG. 5 is an enlarged perspective view showing the inflator disposed on the right side of the vehicle body and portions around the inflator in the situation shown in FIG. 4.

As shown in FIG. 5, in the airbag device 10, the gas-injection port 36 of the inflator 18 is positioned so as to overlap the attachment hinge 26 close to the end 16B in the longitudinal direction of the door 16, particularly, the attachment hinge 26 closest to the end 16B. Therefore, when the gas is injected into the airbag 20, the high inflation pressure of the airbag 20 is applied to the attachment hinge 26 closest to each end 16B, and each end 16B of the door 16. Accordingly, because the inflation pressure of the airbag 20 is transmitted to the door 16, a sufficient moment is applied such that the door 16 pivots around the attachment hinges 26 and is opened. Thus, the entire door 16 from the center to the both ends 16B is sufficiently opened. That is, the door 16 is uniformly opened while the door 16 is maintained in a flat state. Even when the door 16 is curved in the plan view as in this embodiment, the entire door 16 from the center to the both ends 16B can be sufficiently opened.

As shown in FIG. 4, when the door 16 is opened, the airbag 20 passes through the opening 12A in the hood outer panel 12, and is deployed toward the outside of the hood 14. Thus, after the impactor hits the front bumper 24, the impactor hits the rear portion of the hood 14, the lower portion of the front windshield, and the airbag 20 that is deployed to cover the right and left front pillars. Accordingly, the impact is absorbed.

In this embodiment, the vehicle-body outer panel is the hood outer panel 12. However, the vehicle-body outer panel is not limited to the hood outer panel 12. For example, the vehicle-body outer panel may be a cowl or a roof. Also, although a pair of inflators 18 is used in this embodiment, three or more inflators 18 may be used.

The invention claimed is:

1. An Airbag device comprising:
a door which is provided in a hood outer panel, and which is opened to open an opening in the hood outer panel when a predetermined situation occurs;
an inflator which is disposed inside the door, and which includes a gas-injection port that is disposed such that pressure of gas applied to an end of the door in a longitudinal direction of the door is higher than pressure of the gas applied to a center of the door in the longitudinal direction of the door; and
an airbag that is disposed at a predetermined position inside the hood outer panel,
wherein when the predetermined situation occurs, the airbag is inflated by the pressure of the gas supplied from the inflator to open the door, and the airbag passes through the opening in the hood outer panel, and is deployed toward an outside of a vehicle body; and
wherein the gas-injection port is disposed in an area that overlaps at least an attachment hinge provided in the door, in the longitudinal direction of the door.

2. The airbag device according to claim 1, wherein the attachment hinge, which overlaps the area in which the gas-injection port is disposed, is an attachment hinge closest to the end of the door, among a plurality of attachment hinges provided in the door in the longitudinal direction of the door.

3. The airbag device according to claim 2, wherein at least the attachment hinge closest to the end of the door includes a deformable portion that can be plastically deformed when the door is opened.

4. The airbag device according to claim 1, wherein the deformable portion includes a droop portion that is elongate, and extends downward from a connection portion connected to the door, and an intermediate portion that extends toward a rear of a vehicle from the droop portion.

5. The airbag device according to claim 1, wherein the gas-injection port is provided at a position corresponding to a position of each of all the attachment hinges.

6. The airbag device according to claim 1,
wherein a position of the gas-injection port is set such that a reference position of the gas-injection port is at a distance of 50 mm to 150 mm from the end of the door toward the center of the door in the longitudinal direction of the door, and
wherein the reference position is a centroid of a single hole of the gas-injection port, or a centroid of a predetermined hole among a plurality of holes of the gas-injection port, a force of the gas injected through the predetermined hole being greatest among forces of the gas injected through all the plurality of holes of the gas-injection port.

7. The airbag device according to claim 6, wherein the gas-injection port is composed of the plurality of holes that are arranged in a staggered manner in an end portion of the inflator in the longitudinal direction of the door.

8. The airbag device according to claim 1, further comprising:
a diffuser pipe that is fitted to the inflator.

9. The airbag device according to claim 8, wherein the diffuser pipe has an L-shape, and the gas-injection port is an end portion of the diffuser pipe, which is open to the door.

10. The airbag device according to claim 8, wherein the diffuser pipe is elongate in the longitudinal direction of the door, and the gas-injection port is composed of a plurality of holes that are arranged in an outer peripheral surface of the diffuser pipe.

11. The airbag device according to claim 1, wherein the door is curved in a plan view of the door.

* * * * *